United States Patent
Coudroy et al.

(10) Patent No.: US 10,393,561 B2
(45) Date of Patent: Aug. 27, 2019

(54) PRODUCTION OF HYDROCARBONS WITH METRIC COUNTER

(71) Applicant: Total S.A., Courbevoie (FR)

(72) Inventors: Cécile Coudroy, Orthez (FR); Jean Paul Couput, Pau (FR); Renaud Caulier, Pau (FR); Vincent Arendo, Pau (FR)

(73) Assignee: Total S.A., Courbevoie (FR)

( * ) Notice: Subject to any disclaimer, the term of this patent is extended or adjusted under 35 U.S.C. 154(b) by 0 days.

(21) Appl. No.: 15/514,322

(22) PCT Filed: Sep. 25, 2014

(86) PCT No.: PCT/FR2014/052417
§ 371 (c)(1),
(2) Date: Mar. 24, 2017

(87) PCT Pub. No.: WO2016/046454
PCT Pub. Date: Mar. 31, 2016

(65) Prior Publication Data
US 2017/0276529 A1    Sep. 28, 2017

(51) Int. Cl.
*G01F 7/00* (2006.01)
*C10G 1/00* (2006.01)
(Continued)

(52) U.S. Cl.
CPC .............. *G01F 7/005* (2013.01); *C10G 1/00* (2013.01); *E21B 34/06* (2013.01); *E21B 43/00* (2013.01);
(Continued)

(58) Field of Classification Search
None
See application file for complete search history.

(56) References Cited

U.S. PATENT DOCUMENTS

| 6,561,041 B1 | 5/2003 | Eck |
| 2005/0149307 A1* | 7/2005 | Gurpinar .............. E21B 43/00 703/10 |

(Continued)

FOREIGN PATENT DOCUMENTS

| WO | WO 2006/048418 A1 | 5/2006 |
| WO | WO 2007/116008 A1 | 10/2007 |

(Continued)

OTHER PUBLICATIONS

Han van Dal, Spirit Innovative Technologies 2011, The Netherlands, All Rights Reserved, 2011, 17 pages.*

(Continued)

*Primary Examiner* — Tung S Lau
(74) *Attorney, Agent, or Firm* — Knobbe Martens Olson & Bear, LLP

(57) ABSTRACT

An improved solution for estimating the flow rate of a fluid in a line of a hydrocarbon production installation, during production. Systems and methods for producing hydrocarbons on a line of a hydrocarbon production installation can include at least two devices adapted each for providing an estimate of the flow rate of a fluid in the line based on respective data. The devices include at least one metric counter, and the data relative to the provision of an estimate of the flow rate by the metric counter include a measurement done by at least one sensor of the metric counter on the fluid. Further, data can be determined relative to the provision of an estimate of the flow rate by the devices, and a DVR process involving the determined data, the reconciliation being conditioned by at least a substantial equality between the estimates of the flow rate of the fluid.

20 Claims, 3 Drawing Sheets

(51) Int. Cl.
    *G01F 25/00*     (2006.01)
    *G01F 1/34*     (2006.01)
    *G01F 1/74*     (2006.01)
    *E21B 43/00*     (2006.01)
    *E21B 47/10*     (2012.01)
    *E21B 34/06*     (2006.01)
    *E21B 47/06*     (2012.01)

(52) U.S. Cl.
    CPC .............. *E21B 47/06* (2013.01); *E21B 47/10* (2013.01); *G01F 1/34* (2013.01); *G01F 1/74* (2013.01); *G01F 25/0007* (2013.01)

(56) References Cited

U.S. PATENT DOCUMENTS

| | | | |
|---|---|---|---|
| 2008/0162224 A1* | 7/2008 | Coon | G06Q 10/0639 705/7.38 |
| 2017/0124669 A1* | 5/2017 | Finkel | G06Q 50/06 |
| 2017/0275981 A1* | 9/2017 | Coudroy | E21B 43/00 |

FOREIGN PATENT DOCUMENTS

| | | |
|---|---|---|
| WO | WO 2008/104750 A1 | 9/2008 |
| WO | WO 2010/067038 A1 | 6/2010 |

OTHER PUBLICATIONS

Introduction to Data Reconciliation, Introducing Process Integration for Environmental Control in Engineering Curricula, 2003, 98 pages.*

"Data Reconciliation in Flow Measurement," Tuvnel, Jun. 9, 2010, in 37 pages.

Den Bleker, S.R., "AES/PE/14-11 Definition and Evaluation of Production Test Validation Methods Applied to Vx Multiphase Flow Meters," Delft University of Technology, Aug. 22, 2014, in 64 pages.

Haouche, M., et al., "Smart Metering: An Online Application of Data Validation and Reconciliation Approach," Society of Petroleum Engineers, SPE Intelligent Energy International, Utrecht, the Netherlands, Mar. 27-29, 2012, in 10 pages.

Haouche, M., et al., "Virtual Flow Meter Pilot: Based on Data Validation and Reconciliation Approach," Society of Petroleum Engineers, SPE International Production and Operations Conference and Exhibition, Doha, Qatar, May 14-16, 2012, in 13 pages.

International Search Report dated Feb. 12, 2015, in related International Application No. PCT/EP2014/070235, in 4 pages.

International Search Report dated Jun. 8, 2015, in related International Application No. PCT/FR2014/052417, in 3 pages.

International Search Report dated Jun. 8, 2015, in related International Application No. PCT/FR2014/052418, in 2 pages.

Petukov, A., et al., "Virtual Metering System Application in the Ceiba Field, Offshore Equatorial Guinea," Society of Petroleum Engineers, SPE Digital Energy Conference and Exhibition, Woodland, Texas, USA, Apr. 19-21, 2011, in 21 pages.

Preveral, A., et al., "Geographically-Distributed Databases: A Big Data Technology for Production Analysis in the Oil & Gas Industry," Society of Petroleum Engineers, SPE Intelligent Energy Conference and Exhibition, Utrecht, the Netherlands, Apr. 1-3, 2014, in 9 pages.

Vannes, K., et al., "Improved Subsea Fiscal Metering," FMC Technologies, Oct. 25, 2013, in 26 pages.

* cited by examiner

PRODUCTION OF HYDROCARBONS WITH METRIC COUNTER

CROSS-REFERENCE TO RELATED APPLICATIONS

This application claims the benefit and priority to and is a U.S. National Phase of PCT International Application Number PCT/FR2014/052417, filed on Sep. 25, 2014. The disclosure of the above-referenced application are hereby expressly incorporated by reference in its entirety.

The present invention relates to the field of hydrocarbon production, and more specifically a method for producing hydrocarbons on a line of a hydrocarbon production installation comprising at least two devices adapted each for providing an estimate of the flow rate of a fluid in the line and including at least one metric counter.

Hydrocarbon production installations comprise lines in which fluids flow. These may be production lines comprising a production well and in which hydrocarbons flow from a hydrocarbon tank toward a wellhead. These may also be injection lines comprising an injection well and in which injection fluids flow, i.e., fluids one wishes to inject into the tank, for example a water-polymer mixture (in particular in the context of assisted recovery).

It is common today to try to provide an estimate of the flow rate of the fluid flowing in such a line. Indeed, in a known manner, the supplied flow rate estimate allows better management of the line. One thus obtains better oversight or better knowledge of the overall production of the installation, owing to the estimate potentially supplied for each line, typically in real time and on a line-by-line basis.

One approach consists of looking for an estimate of the fluid flow rate via a device and based on data relative to the device, using a thermodynamic model provided to that end, the device (integrated in the line) and the respective data initially not being provided for that purpose. One then obtains a "virtual" counter. In this context, some solutions use several models of this type, based on data respective to different devices, and each model theoretically provides a different estimate of the flow rate for equivalent given production conditions (e.g., gas/oil/water fractions). Typically, a maximum of two or three models are chosen and the data relative to the production conditions (water/oil/gas fraction) are corrected so that the flow rate estimates are similar. This approach is not fully satisfactory, in that the supplied estimate of the flow rate is not close enough to the actual flow rate.

Another approach consists of using a metric counter positioned in the line for which one wishes to determine the flow rate. Metric counters are devices adapted for taking a measurement on the fluid flowing in the line, and directly providing an estimate of the flow rate of the fluid in the line based (at least) on the measurement. The known metric counters also use the value of at least one parameter, commonly called "calibration parameter". To that end, a metric counter can in particular take one or several physical measurements (e.g., electric, nuclear and/or optical, for example permittivity, conductivity and/or gamma attenuation measurements). Such a metric counter may, for various reasons, provide an estimate that is not fully satisfactory. For example, it is necessary for as accurate a value as possible to be assigned to the calibration parameters, failing which the estimate of the flow rate of the fluid in the line provided by the metric counter would be too far removed from reality, and therefore unusable. This is especially true when we consider flare gas counters or fiscal counters, for which it is particularly critical to obtain an estimate closely corresponding to reality. Yet the calibration parameter can often be erroneous, for example due to a drift of the sensors.

The aim of the present invention is to provide an easy-to-implement solution for estimating the flow rate of a fluid in a line of a hydrocarbon production installation, during production, as accurately as possible.

To that end, the present invention proposes a method for producing hydrocarbons on a line of a hydrocarbon production installation comprising at least two devices adapted each for providing an estimate of the flow rate of a fluid in the line based on respective data. The devices include at least one metric counter, and the data respective to the provision of an estimate of the flow rate by the metric counter include a measurement done by at least one sensor of the metric counter on the fluid. During production, the method comprises determining the data respective to the provision of an estimate of the flow rate by the devices, and a data reconciliation and validation process involving the determined data, the reconciliation being conditioned by an at least substantial equality between the estimates of the flow rate of the fluid to be provided by each of the devices.

The invention also proposes a computer program, recordable on a data storage memory, comprising instructions for carrying out the method.

The invention also proposes a system adapted for communicating with at least two devices adapted each for providing an estimate of the flow rate of a fluid in a hydrocarbon production line based on respective data, the devices including at least one metric counter, and the data respective to the provision of an estimate of the flow rate by the metric counter including a measurement done by at least one sensor of the metric counter on the fluid, the system comprising a memory having recorded the program.

The invention also proposes a hydrocarbon production installation. The installation comprises a line comprising at least two devices adapted each for providing an estimate of the flow rate of a fluid in a hydrocarbon production line based on respective data, the devices including at least one metric counter, and the data respective to the provision of an estimate of the flow rate by the metric counter including a measurement done by at least one sensor of the metric counter on the fluid. The installation also comprises the system, the system then being adapted for communicating with the devices of the line.

According to preferred embodiments, the invention comprises one or more of the following features:

- the data reconciliation and validation process minimizes a cost function penalizing, for each reconciled datum, the difference between its value before reconciliation and its reconciled value;
- the difference is weighted in the cost function by an uncertainty relative to said reconciled datum;
- the method further comprises a detection of any reconciled datum for which the difference between its value before reconciliation and its reconciled value is above a threshold depending on the uncertainty relative to the reconciled datum;
- the method comprises reiterating the data reconciliation and validation process, removing the reconciled datum with the greatest weight in the value of the cost function, as long as the value of the cost function is above a predetermined threshold; the method further comprises providing the reconciled value of the fluid flow rate in the line;
- the method further comprises providing an uncertainty relative to the reconciled value of the fluid flow rate in the line depending on the difference between its value before reconciliation and its reconciled value;

aside from the metric counter, the devices comprise at least one choke, a device associated with an inflow module, and/or a pipe;

the measurement done by the sensor of the metric counter on the fluid is an electric, nuclear and/or optical measurement;

the choke is adapted for providing an estimate of the flow rate of the fluid in the line based on a valve opening and a measurement done by at least one sensor on the fluid supplying the pressure losses associated with the valve opening;

the device associated with the inflow module is adapted for providing an estimate of the flow rate of the fluid in the line based on a pressure measurement done by at least one sensor on the fluid and physicochemical properties of the fluid; and/or the pipe is adapted for providing an estimate of the flow rate of the fluid in the line based on geometric and/or mechanical properties of the pipe and a measurement done by at least one sensor on the fluid supplying the pressure losses associated with the geometric and/or mechanical properties of the pipe.

Other features and advantages of the invention will appear upon reading the following description of one preferred embodiment of the invention, provided as an example and in reference to the appended drawing.

Figure 1:
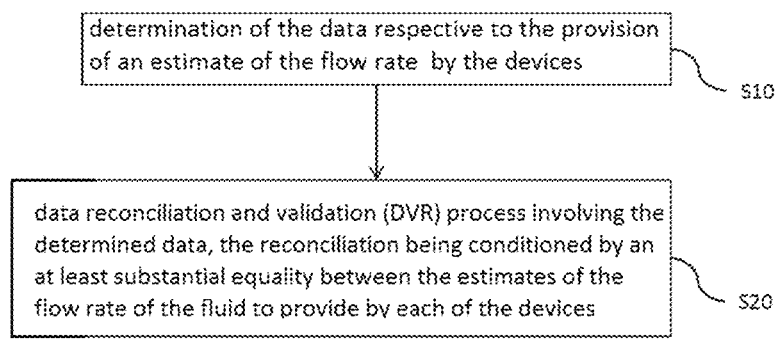
FIG. 1 shows a diagram of the method.

FIG. 1 shows the hydrocarbon production method. The steps of the method are carried out on a line of a hydrocarbon production installation comprising at least two devices. Each of the devices is adapted for providing an estimate of the flow rate of a fluid in the line based on respective data. The devices include at least one metric counter. The data respective to the provision of an estimate of the flow rate by the metric counter include a measurement done by at least one sensor of the metric counter on the fluid. During production, the method comprises determining S10 the data respective to the provision of an estimate of the flow rate by the devices, and a data reconciliation and validation process (DVR) S20. The DVR process involves the determined data, and the reconciliation is conditioned by an at least substantial equality between the estimates of the flow rate of the fluid to provide by each of the devices. The method of FIG. 1 makes it possible to estimate the flow rate of the fluid in the line easily and relatively accurately (i.e., with a result relatively close to the actual value of the flow rate).

Indeed, the method fits into the context where the line of the hydrocarbon production installation in which the fluid whose flow rate must be estimated flows comprises a metric counter. The expression "metric counter", understood by one skilled in the art, refers to the aforementioned devices. The metric counter can therefore in particular, in order to provide an estimate of the flow rate, take one or several physical measurements on the fluid (e.g., electric, nuclear and/or optical, for example permittivity, conductivity and/or gamma attenuation measurements), and the counter can use predetermined values of calibration parameters and/or predetermined fluid hypotheses. Thus, the method already has a relatively good estimate of the flow rate. However, the method goes further, since it takes account of at least one other device of the line adapted for providing an estimate of the fluid flow rate in order to improve the estimate. In particular, it implements a DVR process whereof the reconciliation is conditioned by an at least substantial equality between the estimates of the flow rate of the fluid to be provided by each of the devices (including the metric counter). Thus, the method uses the redundancy of information provided by several devices to improve the estimate. Furthermore, the DVR process involving the data relative to the provision of an estimate by each device (and not only the provided estimates), these data are challenged directly, which makes it possible to obtain a better estimate. These data may comprise measurements that improve the estimate by being called into question. In particular, the measurement done by the sensor of the metric counter is also called into question in the DVR process, unlike a naïve approach, where the flow rate value provided by the metric counter would be the only datum incorporated into the DVR process.

Thus, the flow rate estimate done by the method can be implemented within a more global hydrocarbon production method in order to improve the production, said production being done by the hydrocarbon production installation incorporating the line. The method may for example comprise providing, for example to a data warehouse, the reconciled value of the fluid flow rate in the line, i.e., a value corresponding to the estimates of the flow rate provided by the various devices once the respective data are reconciled (for example, an average), knowing that these estimates are at least substantially equal, by the very definition of the reconciliation process. This makes it possible for specialists given the reconciled value to study the production. The method may also comprise providing an uncertainty relative to the reconciled value of the fluid flow rate in the line. The uncertainty may depend on the difference between the value of the flow rate before reconciliation and the reconciled value of the flow rate. The value before reconciliation may be the value provided by the metric counter, without taking the reconciliation into account. Alternatively, the value before reconciliation may refer to a vector made up of each of the values of the flow rate provided by a respective device without the reconciliation (this estimate without reconciliation, therefore relatively erroneous, may be computed in parallel with the reconciled value derived from the DVR process). Thus, the method may provide an uncertainty by device providing a respective estimate, based on the difference between the value before reconciliation supplied by the device and the reconciled value. This makes it possible to detect the devices providing the least accurate estimates, for example with traditional comparisons between the various supplied values. Thus, the method of FIG. 1 allows better management of the line, the installation, and therefore the production.

As explained above, the estimate of the flow rate in a line of a hydrocarbon production installation in particular owing to the integration of the metric counter in the line allows better management of the line, with better oversight or better knowledge of the overall production of the installation and/or quantities of injected fluids, e.g., in real time and/or on a line-by-line basis. The method of FIG. 1 then makes it possible to improve the estimates provided for each line on which it is implemented, which improves the overall management of the production. Thus, the method can be implemented during production on several lines, whether injection and/or production lines, steps S10 and S20 being carried out for each line independently of the other lines, typically continuously. The flow rate estimates provided for each line following the reconciliation can then be centralized to manage the production.

The fluid flowing in the line can have a single phase, and in this case, estimating the flow rate of the fluid in the line simply consists of providing a value for the flow rate of the sole phase of the fluid. This is typically the case for an injection line. A counter can perform this estimate based on any model using a measurement on the fluid by at least one sensor of the counter. The model may further involve the value of at least one calibration parameter that corresponds to the measurement of the sensor under a predetermined flow condition of the fluid in the line (for example, a predetermined flow rate or flow speed).

Alternatively, the fluid flowing in the line may have several phases. This is typically the case for a production line, since the produced hydrocarbons typically comprise a water phase, a gas phase and an oil phase. In this case, estimating the flow rate of the fluid in the line may consist of providing the information making it possible to determine the flow rate of each phase. This information may directly comprise an estimate of the flow rate of each phase, and/or an estimate of the fraction (e.g., instantaneous) of each phase in the multiphase fluid in addition to the cumulative flow rate (e.g., instantaneous) of the multiphase mixture in the line. In the second case, it suffices simply to multiply the fraction of a respective phase and the cumulative flow rate to obtain the flow rate of the respective phase. In the case of a multiphase fluid, the metric counter is referred to as a multiphase flow meter (MPFM). This may for example be a mass flow sensor or an analyzer. Such a counter involves complex technologies, and the measurements given by the sensor(s) included in such a counter are in particular highly sensitive to the properties of the fluids. Consequently, the counter often does not use the correct calibration parameters and/or some of the sensors may drift more quickly than anticipated, causing the counter to provide a relatively inaccurate value of the fluid flow rate. The method of FIG. 1 makes it possible to offset this problem.

Figure 2:
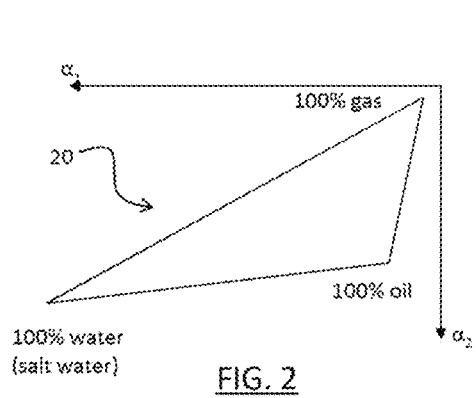
FIGS. 2 to 3 illustrate the operation of one example metric counter.
Figure 3:
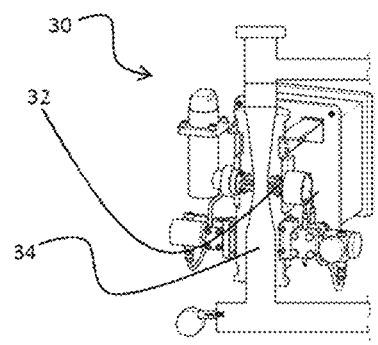
Figure 4:
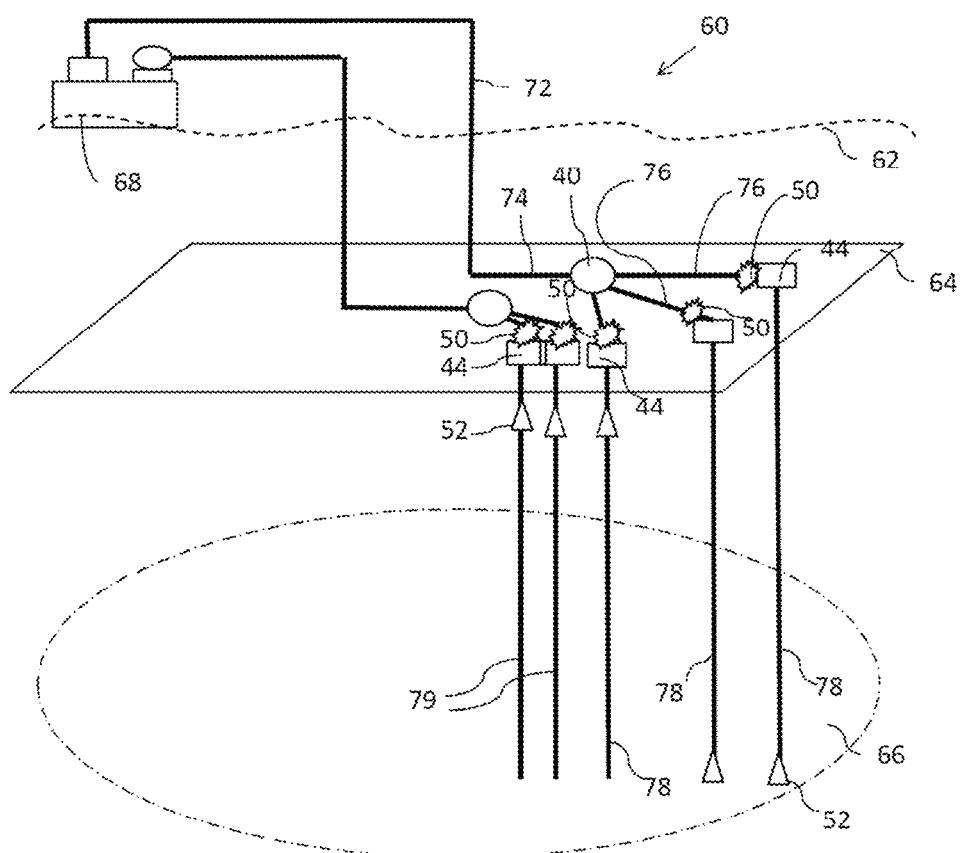
FIG. 4 shows a diagram of one example of a hydrocarbon production installation.

The counter may in particular work using the following principle, described in reference to FIGS. 2-4.

The sensor of the metric counter may be a traditional gamma sensor, sending waves through the fluid at the sensor and measuring the mass attenuation of the wave. The sensor may be adapted for sending several energy levels, so as to allow sufficient information crosschecking for a multiphase fluid. Below, $\alpha$ denotes the linear attenuation in m-1, $\mu$ denotes the mass attenuation in $m^2$/kg, and $\rho$ denotes the volume density in kg/m3. By definition, $\alpha=\mu*\rho$. The mass attenuation $\mu$ depends on the compound and the gamma energy level.

For the hydrocarbon fluid in the above example (a water phase, an oil phase and a gas phase), it suffices for the sensor to be capable of taking at least two measurements (e.g., corresponding to two different energy levels). These measurements are then part of the data involved in the DVR process of the method of FIG. 1. Traditionally, reference is made to low energy level and high (or mean) energy level, respectively corresponding to indices 1 and 2 in the notations below. The calibration parameters then comprise an attenuation value for each pure phase, per energy level, which can be denoted $\mu_{gas\_1}$, $\mu_{gas\_2}$, $\mu_{oil\_1}$, $\mu_{oil\_2}$, $\mu_{water\_1}$ and $\mu_{water\_2}$, and they can also be involved in the DVR process. Thus, $\mu_{ph\_i}$ is the mass attenuation $\mu$ measured by the sensor for energy level i, in the presence only of phase ph.

It should be noted that if, for a given hydrocarbon production installation, the salinity of the wells is different from one well to another, these parameters may then vary. Conversely, two wells with the same salinity should have the same water attenuation values for a same production installation. Furthermore, it should be noted that the sensor can in fact also measure a third energy level, for example even higher than the other two. At such an energy level, and in general at particularly high energy levels (e.g., N>250-300 keV), the various compounds absorb substantially the same quantity of energy (this can be reflected by the fact that the mass attenuations are approximately equal at this energy level). A counter may, however, use this energy to validate its estimate of the flow rate and/or the water, oil and gas fractions provided based on the other two energy levels, preferably with a high uncertainty. It is also possible to link the measurement done for this third energy level to the density of the mixture by a line obtained after calibration.

Owing to the knowledge of the parameters $\mu_{gas\_1}$, $\mu_{gas\_2}$, $\mu_{oil\_1}$, $\mu_{oil\_2}$, $\mu_{water\_1}$ and $\mu_{water\_2}$, it is possible to outline a so-called "calibration triangle" based on the following six values:

$\alpha_{gas\_1} = \mu_{gas\_1} * \rho_{gas}$
$\alpha_{gas\_2} = \mu_{gas\_2} * \rho_{gas}$
$\alpha_{oil\_1} = \mu_{oil\_1} * \rho_{oil}$
$\alpha_{oil\_2} = \mu_{oil\_2} * \rho_{oil}$
$\alpha_{water\_1} = \mu_{water\_1} * \rho_{oil}$
$\alpha_{water\_2} = \mu_{water\_2} * \rho_{oil}$ The volume densities $\rho$ are variables that depend on the pressure P and temperature T values of the line where the counter is operating and the composition of the fluid, information also provided (e.g., by a measurement done by dedicated sensors, e.g., by other devices, for example one or several of those adapted for providing another estimate of the flow rate, in particular for example for P and T, or by a predetermined value, in particular for example for the GOR—"gas/oil ratio" of the hydrocarbon, excluding water—and/or the salinity, which are predetermined fluid hypotheses), and therefore known by the metric counter, which can therefore deduce the volume densities $\rho$ therefrom. Thus, if the operating conditions P and T change and/or if the composition of the fluid (GOR, salinity) changes, the calibration triangle is also modified, since the gas, oil and water densities vary. The linear attenuations thus also vary. In this sense, the volume densities are calibration parameters that in particular correspond to predetermined fluid hypotheses (GOR and salinity). Some or all of these data can also be part of the data involved in the DVR process. FIG. 2 schematically shows a calibration triangle 20 corresponding to such a calibration, with coordinate apices ($\alpha_{gas\_1}$, $\alpha_{gas\_2}$), ($\alpha_{oil\_1}$, $\alpha_{oil\_2}$), and ($\alpha_{water\_1}$, $\alpha_{water\_2}$), therefore corresponding to the six values listed above.

FIG. 3 shows an example of the counter: the counter 30. To perform the calibration, the counter 30 can receive a sample 34 of each of the phases. Next, in S20, the counter 30 uses a sensor 32 provided to that end to measure the mass attenuations of each of the phases, which makes it possible to determine S30 the calibration parameters (i.e., the linear attenuations, and/or the mass attenuations themselves, depending on the selected point of view, knowing that one or the other of these data can be saved by the counter as calibration parameter, subject to next performing the appropriate computation). During use, the counter 30 measures a mass attenuation of the fluid (which is then a multiphase mixture). The detector of the sensor 32 measures and saves "counts" Nicounts for each energy level (at least the "low" 1 and "high" 2 levels, and potentially an even higher level as well).

Owing to the following equations:

$$N^i_{counts} = N^i_0 * decay * \exp[-(x_{water} * \mu_{water-i} * \rho_{water} + x_{gas} * \mu_{gas-i} * \rho_{gas} + x_{oil} * \mu_{oil-i} * \rho_{oil}) \times Dthroat]$$

for i=1 and 2, and $$x_{water} + x_{gas} + x_{oil} = 1,$$

with $x_{water}$, $x_{gas}$ and $x_{oil}$ designating the fractions of each of the phases, the volume densities $\rho$ that are predetermined and given by the composition and the thermodynamics, and $N^i_0$, decay and Dthroat that are known (Ni0 being the number of counts, therefore attenuation, empty, decay being a value taking the decline of the source into account, Dthroat being the diameter of the throat of the Venturi) the counter 30 can determine the instantaneous fractions of each of the phases.

A computer program can be provided to carry out the method. In a known manner in computers, this program is able to be saved in a data storage memory and may comprise instructions for carrying out the method, in particular steps S10 and S20. Thus, any computer system may comprise a memory having saved the program. In all cases, the computer program is provided to command the execution of the method by a system provided to that end. The system (which may be one of the devices, for example the metric counter) is suitable for communicating with the (other) devices suitable for providing the estimate of the flow rate whose estimates are reconciled, potentially including the metric counter. In a known manner in computers, this program is able to be saved in a data storage memory and may comprise instructions. Thus, the computer program is saved by a memory of the metric counter or by a memory of another system suitable for communicating in particular with the metric counter. The system may typically comprise a processor and a transceiver for remote communication. The computer program may comprise any type of instructions known in computing. These instructions may be lines of code, written in a computer language, for example object-oriented, possibly in the form of source code, compiled code or precompiled code. It may also involve an installation program (i.e., making a metric counter or a system suitable for carrying out the method or commanding the execution thereof). The program may be tangibly saved on a storage memory suitable for that purpose. It may involve a volatile or nonvolatile memory, for example EPROM, EEPROM, flash memory or CD-ROM.

FIG. 4 shows an example of a hydrocarbon production installation comprising several metric counters, in which the method can be implemented.

The installation 60 comprises a hydrocarbon production line, made up of several pipes in which the fluid flows, the pipes thus each forming a respective production (sub-) line. The production line in particular comprises several fluid production wells 78 emerging from the hydrocarbon tank 66. Three production wells 78 are shown in the figure, but any number suitable for optimal coverage of the tank 66 can be configured to account for the geological complexity of the tank, the quality of the fluids present in the tank, the geographical location of the tank (on land, at sea, very deep sea), and inherent constraints. The production line comprises a fluid pipe 74 supplied with fluid by a manifold 40. The fluid production pipe 74 is a main receiving the fluid from all of the production wells 78 drilled in the tank 66 via a manifold (here, the manifold 40), acting as a unifier. The fluid production pipe 74 is situated on a seabed 64, and supplies a riser 72 (i.e., a substantially vertical pipe) leading to a main station, e.g., in the case at hand, a floating production, storage and offloading (FPSO) unit 68 situated on the marine surface 62. The installation 60 also comprises an injection line comprising several injection wells 79, and operating according to a principle symmetrical to that of the production line.

The installation 60 also incorporates (i.e., comprises) a metric counter 50 as previously described for each production well 78 and each injection well 79. The metric counter 50 is shown in the figure upstream from the wellheads 44, each time on a pipe of the line, but it may be in any other appropriate location as assessed by one skilled in the art. Furthermore, the installation 60 could comprise a quantity of metric counters 50 lower or higher than that shown in the figure, depending on the operating needs. The installation 60 also comprises other devices 52 positioned on different lines in any location appropriate for their function (not outlined here), each being suitable for providing an estimate of the flow rate in the line where it is installed in addition to its function. In all cases, the installation 60 is suitable for carrying out the method of FIG. 1 on at least some of the lines comprising a metric counter 50, either by the metric counters 50 themselves, which then have a program comprising instructions to that end and are suitable for communicating with the devices 52, or by a system suitable for communicating with the metric counters 50 and the devices 52. The installation 60 allows better hydrocarbon production, owing to a good subsequent estimate of the flow rates.

The DVR process S20 will now be discussed.

The data reconciliation and validation (DVR) process involves the data determined in S10. This means that the DVR process calls all of these data into question. Indeed, the data "involved" in the DVR process are, by definition, the variables of the DVR process. The reconciliation is conditioned by an equality (e.g., at least substantial, i.e., with a difference below a predetermined, or zero, error) between the estimates of the flow rate of the fluid to be provided by each of the devices. In other words, the DVR is done on the basic hypothesis that the estimates of the fluid flow rate to be provided by each of the devices (independently of one another, i.e., outside any reconciliation) should be equal.

DVR is a known process making it possible to provide input values (i.e., the involved data, e.g., respective measurements from the devices, including the measurement by the sensor of the metric counter, and in fine reconciled by the process) and to modify these values based on predetermined uncertainty intervals and predetermined constraints, to comply with one or several condition(s) directly or indirectly involving the values in question. This may be done effectively by minimizing a cost function penalizing, for each reconciled datum, the difference between its value before reconciliation and its reconciled value. Furthermore, for a finer use of the DVR, the difference can be weighted in the cost function by an uncertainty relative to said reconciled datum. The greater the uncertainty, the smaller the penalty associated with the difference between the value before reconciliation and the reconciled value, since the difference is more "expected" in theory. This uncertainty can be determined in any manner, for example based on predetermined knowledge, for example from the geologist. Thus, particularities are taken into account related to each of the data involved in the DVR process.

Thus, the DVR process may consist in general of resolving the following minimization program:

$$\text{Min} \sum_i \left(\frac{k_i^* - k_i}{e_i}\right)^2$$

with k, the data involved in the process (i.e., the data to be reconciled),
$e_i$ the uncertainty of the datum i,
$k_i^*$ the reconciled value of the datum i,
$e_i^*$ the reconciled uncertainty of the datum i,
$y_j$ the variables not measured and therefore for example computed,
and the term $$\left(\frac{k_i^* - k_i}{e_i}\right)^2$$

is called "penalty",
under the aforementioned constraint and linking the variables $k_i$ and $y_j$.

Indeed, the method carries out a DVR to "equalize" certain values. Specifically, the data determined in S10 are theoretically supposed to yield the same estimate result for the fluid flow rate for each respective device. Thus, the sum of the penalties is minimized by at least substantially respecting this equality constraint. Furthermore, the DVR method may comprise one or several inequality constraints of type $G(k_i^*, y_j) > 0$, which for example corresponds to the bounds of the system (e.g., the fact that a pressure must be greater than 0, that a ratio, such as the water-cut, must be below 1). This makes it possible to reduce the risk of unrealistic reconciliation.

In one example, the described solution may consider all of the modeled measurements, models and parameters of the system and take account of their respective uncertainties in order to provide a single estimate of each measurement or each computable parameter with a computed uncertainty guaranteeing the quality of the final value. The redundancy of the measurements is then a key factor. The reconciliation of several models and measurements constitutes a sort of advanced virtual counter. In order to eliminate interpretation errors by the computers used in most counters, the method uses the wrong measurements from each counter and clearly defined equations that are reconciled with the other data of the system. To that end, the DVR methodology is used: the idea of DVR is to use the redundancy of data from a system as a source of information to correct the measurements. Each measurement is corrected as little as possible, such that the corrected values meet all of the constraints of the process. The proposed method works primarily in steady state. However, some transient states due to operations may be detected automatically (e.g., starting of a well), and either the measurements and models influenced by these states are then removed from the reconciliation, or the associated uncertainties are then increased so that the optimizer understands that these data are not in their typical precision range. Lastly, in one example, the DVR methodology used manages the retention times of the production fluids when the lines are long: thus, the flow rates at the surface treatment at time t will be reconciled with flow rates at the wells at time t-2 h, for example. In other words, in one example, the method may ensure that the data determined in S10 and therefore involved in S20 are all relative to the provision of different flow rate estimates, these different estimates pertaining to the flow rate at a same moment.

The method may comprise a detection of any reconciled datum for which the difference between its value before reconciliation and its reconciled value is above a threshold depending on the uncertainty relative to the reconciled datum. Thus, the method detects the data determined in S10 that are too remote from their reconciled value, the remoteness being considered based on the uncertainty relative to the datum. The DVR process can then be reiterated in S20, removing (each time) the reconciled datum with the greatest weight in the value of the cost function. This reiteration can be done as long as the value of the cost function is above a predetermined threshold. This makes it possible to refine the estimate of the flow rate, by leaving out the data determined in S10 as being excessively unreliable.

In one example, the reconciliation is done with all of the data of the model and their uncertainties. If a datum is corrected in an interval twice as high as its original uncertainty, it is detected and therefore considered suspicious. Another detection may be initiated when the sum of the penalties of the reconciliation is above a defined value. If this detection is activated, the most penalized datum will be muted and a new reconciliation will be done without incorporating it. When this other detection is not activated, the reconciliation is completed, but displays a high penalty. In this case, to determine which measurement is erratic, a detailed analysis can be done by giving priority to looking at the data showing the largest penalties. In one example, the method therefore makes it possible to monitor and track all of the sensors remotely (i.e., even in another location), identify faulty sensors remotely, and track the quality of the measurements using computed uncertainties. In one example, the method can also compute replacement values in the locations where the sensors are faulty and in the locations where no sensor has been placed. In one example, the method can use the raw measurements from the counters to avoid interpretation errors by the computers. In one example, the method can supply values and validated uncertainties to all data of the system. In one example, the method allows more reliable reallocation of the production by lines and by wells.

The data involved in the DVR process and determined in S10 will now be discussed.

For each considered device, these data are the baseline data that allow the device to supply an estimate of the flow rate in the line. A same datum may constitute a baseline datum for several devices. "Baseline datum" will be understood by one skilled in the art as a fundamental variable making it possible to compute a flow rate based on physical models, for example thermodynamic and/or mechanical models. This comprises measurements from sensors, predetermined hypotheses, for example fluid hypotheses, and/or values of calibration parameters (for example, physical, mechanical or chemical properties of the devices). The data determined in S10 comprise measurements taken in different locations of the site, for example pressure, temperature or flow rate measurements.

Figure 5:
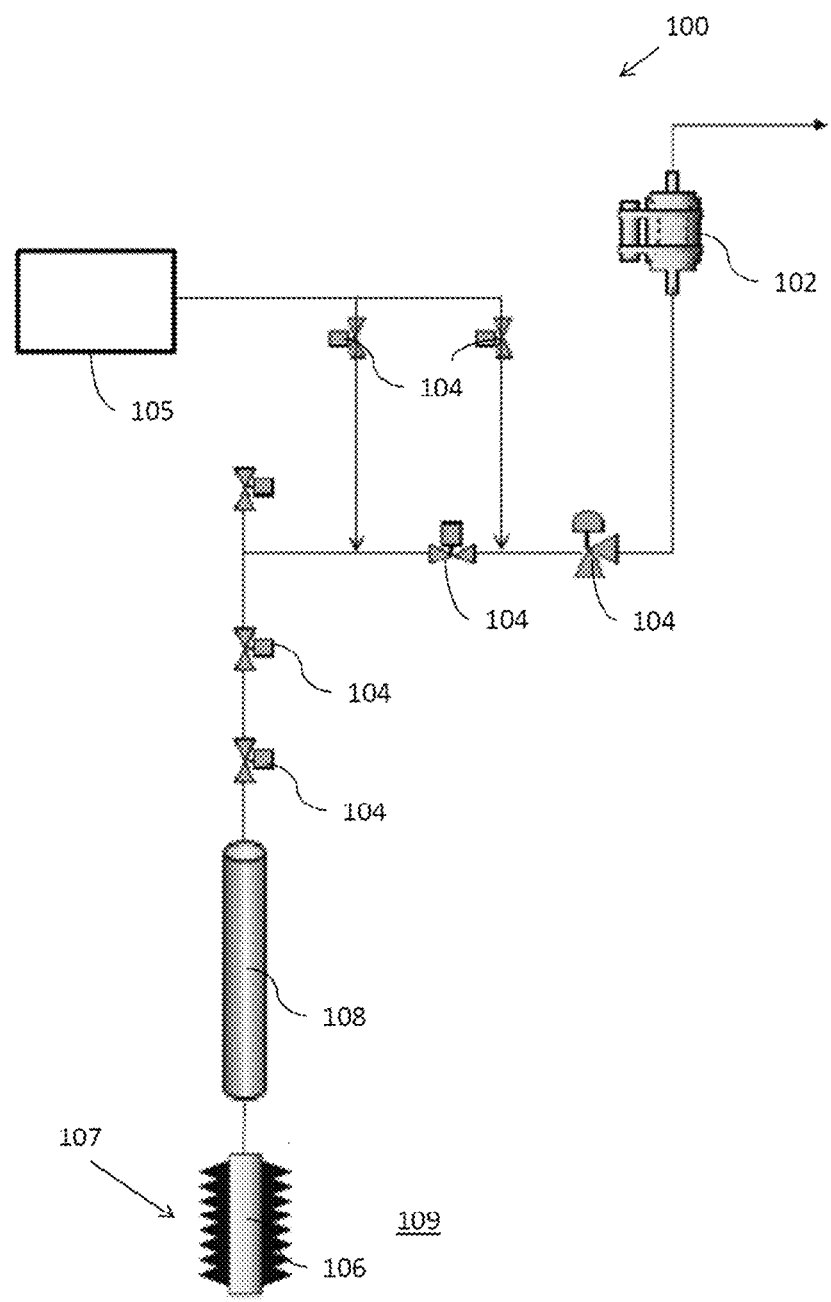
FIG. 5 shows an example of a line on which the method can be carried out.

FIG. 5 shows an example line 100 on which the method can be carried out. The line 100 therefore comprises devices suitable for providing an estimate of the flow rate, which comprise the metric counter 102, the chokes 104 (some of which are connected to a methanol injector 105 and/or only supply the flow rate indirectly), the device 106 associated with an inflow module (with perforations 107 in the tank 109), and the pipe 108, only one segment of which is shown in the figure. This example illustrates a production line with all of the standard devices. The method has been tested on an installation comprising such production lines, and proved effective to improve the supplied estimate of the flow rate (for example, by the metric counter alone).

The operation of these different devices, although known by those skilled in the art, will now be outlined. The various data set out below and making it possible to obtain an estimate of the flow rate for each device can be involved, in whole or at least in part, in the DVR process. Indeed, below, we outline the respective data, for each device, to be determined in S10 (those which may be involved in the DVR process, the others being considered constant or accurate, and therefore generally not being involved). We also outline the sequence of computations making it possible to arrive at the flow rate estimate. The set of all of the computations makes up the constraints of the DVR, the equality condition between the estimates of the fluid flow rate being driven by the use of a same variable in the optimization underlying the DVR described above. It should be noted that respective data for some devices also pertain to the metric counter, such that they are only determined once and they are represented by the same variable in the optimization underlying the DVR. The example where the DVR is done based on all of these models allows as accurate as possible an estimate of the flow rate after reconciliation.

As previously indicated, the measurement done by the sensor of the metric counter on the fluid is an electric, nuclear and/or optical measurement. Thus, the metric counter can for example be suitable for estimating the flow rate from permittivity, conductivity, gamma attenuation (for several energy levels, as previously explained), dP (pressure drop), pressure and temperature measurements. These measurements can then all be involved in the DVR process. Furthermore, the data relative to the metric counter can also comprise predetermined fluid hypotheses as previously explained, such as the GOR (tank fluid composition in tank), salinity, calibration parameters (oil/water/gas gamma attenuations at different energy levels and oil and gas permittivity references). These hypotheses can also then be involved in the DVR process. The metric counter also bases itself on constants to estimate the flow rate, and these constants are not necessarily involved in the DVR process. These are oil and gas permittivity equations (oil and gas reference function, Pressure, Temperature), the gas phase composition, the oil phase composition, the Venturi geometry, and the water conductivity equation (salinity function, Temperature, Pressure). Thus, the model of the metric counter can compute oil/gas/water fractions according to a function f(permittivity or conductivity, gamma attenuation, Pressure, Temperature, GOR, Salinity, oil composition, gas composition, oil permittivity, gas permittivity, oil and gas permittivity equation or water conductivity equation, oil/water/gas gamma attenuation) as previously indicated. The model of the metric counter can also compute oil/gas/water densities according to functions f(oil composition, gas composition, GOR, salinity, Pressure, Temperature). The model of the metric counter can next compute a mixture density according to a function f(oil/water/gas densities, oil/water/gas fractions), then a total flow rate Qtot according to a function f(dP, mixture density, Venturi geometry), then flow rates by Qoil/Qwater/Qgas phase according to a function f (Qtot, oil/water/gas fraction).

A choke is suitable for providing an estimate of the flow rate of the fluid in the line based on a valve opening and a measurement done by at least one sensor on the fluid supplying the pressure losses associated with the valve opening (typically two pressure sensors each supplying a pressure measurement that will be compared). Thus, the measured data are the pressure upstream from the choke, the pressure downstream from the choke, and the subsea valve opening percentage (subsea choke opening %). The hypotheses are the max Cv and the topside valve opening percentage (topside choke opening %). All of these data can be involved in the DVR process. The model can also be based on a constant not involved in the DVR: the choke curve. Thus, the choke makes it possible to provide the Qtot flow rate according to a function f(upstream Pressure, downstream Pressure, choke opening %, mixture density, max Cv, choke curve).

The device associated with the inflow module is the part of the production well at the tank comprising the perforations/openings/inlets for receiving the hydrocarbon. The inflow module is the virtual inflow device for the hydrocarbon in the well. A flow rate estimating model is supplied for this virtual device through sensors belonging to the mentioned part of the production well. Thus, this part of the well may conceptually be "associated" with the inflow module and is thus suitable for supplying an estimate of the fluid flow rate in the line according to the model. The estimate is done based on a pressure measurement done by at least one sensor on the fluid and physicochemical properties of the fluid, all of this data being able to be involved in the DVR process. The inflow module makes it possible to estimate the flow rate based on measurements, which are the well bottom pressure (potentially the pressure at the inlet of the pipe if the pipe is likened to the well) and the initial tank pressure. The model also involves a hypothesis that replaces the initial tank pressure during production, i.e., the interpolated tank pressure (supplied by the geologist). These data are involved by the DVR. Constants that are not involved also come into play: the layer-hole bonding properties. Thus, it is possible to estimate the flow rate of the fluid Qtot according to a function f(well bottom Pressure, tank Pressure (initial or interpolated), layer-hole bonding properties).

The pipe is suitable for providing an estimate of the flow rate of the fluid in the line based on geometric and/or mechanical properties of the pipe and a measurement done by at least one sensor on the fluid supplying the pressure losses associated with the geometric and/or mechanical properties of the pipe. Thus, input Pressure and output Pressure are measured, and/or input Temperature and output Temperature, and mechanical property and thermal property hypotheses of the pipe are formed. All of these data can be involved in the DVR. A non-involved constant, i.e., the geometry of the pipe, then serves as a basis for recursively performing a series of computations making it possible to converge toward a flow rate estimate. These computations are those of the speed according to a function f(Qtot, pipe geometry), flow conditions according to a function f(oil composition, gas composition, mixture density, speed), the total flow rate according to a function f(input Pressure, output Pressure, mixture density, pipe geometry, mechanical properties, flow conditions) or according to a function f(input Temperature, output Temperature, mixture density, pipe geometry, thermal properties, flow conditions). This sequence of computations is repeated recursively, as indicated above.

Of course, the example of FIG. 5 in theory makes it possible to reconcile many data, with a redundancy having a degree equal to the number of available estimates. However, for the lines where fewer data are collected, or when some data are omitted as indicated above, it is possible to reconcile only a combination of the models described above. Inasmuch as the line has a metric counter whereof at least one raw measurement is involved in the reconciliation and at least one estimate other than that of the counter is available (for example, according to one of the above models), the method improves the estimate supplied by the metric counter.

The invention claimed is:

1. A method for producing hydrocarbons on a line of a hydrocarbon production installation comprising at least two devices adapted each for providing an estimate of the flow rate of a fluid in the line based on respective data, the devices including at least one metric counter and at least one other device, and the data respective to the provision of an estimate of the flow rate by the metric counter including a physical measurement done by at least one sensor of the metric counter on the fluid, wherein the method comprises, during the production:
acquiring, by the at least one sensor of the metric counter on the fluid, a value of the physical measurement;
providing to a processor a value of the data respective to the provision of an estimate of the flow rate by the metric counter, including the value of the physical measurement;
providing to the processor a value of the data respective to the provision of an estimate of the flow rate by the other device;
performing, by the processor, a data reconciliation and validation process involving the provided data, the reconciliation being conditioned by an equality between the estimates of the flow rate of the fluid to provide by each of the devices,
the data reconciliation and validation process minimizing a cost function penalizing, for each reconciled datum, the difference between its value before reconciliation and its reconciled value;
providing to a memory coupled to the processor an information based on the data reconciliation and validation process; and
performing an action relative to the production based on the information.

2. The method according to claim 1, wherein the difference is weighted in the cost function by an uncertainty relative to said reconciled datum.

3. The method according to claim 1, wherein the information comprises the reconciled value of the fluid flow rate in the line.

4. The method according to claim 1, wherein aside from the metric counter, the devices comprise at least one choke, a device associated with an inflow module, and/or a pipe.

5. The method according to claim 1, wherein the information includes identification of a faulty sensor.

6. The method according to claim 2, further comprising a detection of any reconciled datum for which the difference between its value before reconciliation and its reconciled value is above a threshold depending on the uncertainty relative to the reconciled datum.

7. The method according to claim 2, comprising reiterating the data reconciliation and validation process, removing the reconciled datum having a weight greater than all other reconciled data in the value of the cost function, as long as the value of the cost function is above a predetermined threshold.

8. The method according to claim 3, wherein the information further comprises an uncertainty relative to the reconciled value of the fluid flow rate in the line depending on the difference between its value before reconciliation and its reconciled value.

9. The method according to claim 3, wherein the action is reallocation of production by lines.

10. The method according to claim 4, wherein:
the physical measurement done by the sensor of the metric counter on the fluid is an electric, nuclear and/or optical measurement,
the choke is adapted for providing an estimate of the flow rate of the fluid in the line based on a valve opening and a measurement done by at least one sensor on the fluid supplying the pressure losses associated with the valve opening,
the device associated with the inflow module is adapted for providing an estimate of the flow rate of the fluid in the line based on a pressure measurement done by at least one sensor on the fluid and physicochemical properties of the fluid, and/or
the pipe is adapted for providing an estimate of the flow rate of the fluid in the line based on geometric and/or mechanical properties of the pipe and a measurement done by at least one sensor on the fluid supplying the pressure and/or temperature losses associated with the geometric and/or mechanical properties of the pipe.

11. The method according to claim 5, wherein the action comprises computing replacement values corresponding to the faulty sensor.

12. A non-transitory data storage memory having recorded thereon a computer program comprising instructions for carrying out a method for producing hydrocarbons on a line of a hydrocarbon production installation comprising at least two devices adapted each for providing an estimate of the flow rate of a fluid in the line based on respective data, the devices including at least one metric counter and at least one other device, and the data respective to the provision of an estimate of the flow rate by the metric counter including a physical measurement done by at least one sensor of the metric counter on the fluid, wherein the method comprises, during the production, by a processor:
receiving a value of the data respective to the provision of an estimate of the flow rate by the metric counter, including a value of the physical measurement acquired by the at least one sensor of the metric counter on the fluid;
receiving a value of the data respective to the provision of an estimate of the flow rate by the other device;
performing a data reconciliation and validation process involving the received values, the reconciliation being conditioned by an equality between the estimates of the flow rate of the fluid to provide by each of the devices, the data reconciliation and validation process minimizing a cost function penalizing, for each reconciled datum, the difference between its value before reconciliation and its reconciled value;
generating and sending to a memory coupled to the processor an information based on the data reconciliation and validation process, an action relative to the production being performable based on the generated information.

13. The non-transitory data storage memory of claim 12, wherein the information includes identification of a faulty sensor.

14. The non-transitory data storage memory of claim 12, wherein the information comprises the reconciled value of the fluid flow rate in the line.

15. The non-transitory data storage memory of claim 13, wherein the action is reallocation of production by lines.

16. A system adapted for communicating with at least two devices adapted each for providing an estimate of the flow rate of a fluid in a hydrocarbon production line based on respective data, the devices including at least one metric counter and at least one other device, and the data respective to the provision of an estimate of the flow rate via the metric counter including a physical measurement done by at least one sensor of the metric counter on the fluid, the system comprising a processor coupled to a memory having recorded thereon a computer program comprising instructions for carrying out a method for producing hydrocarbons on the hydrocarbon production line, wherein the method comprises, during the production, by the processor:
- receiving a value of the data respective to the provision of an estimate of the flow rate by the metric counter, including a value of the physical measurement acquired by the at least one sensor of the metric counter on the fluid;
- receiving a value of the data respective to the provision of an estimate of the flow rate by the other device, and
- performing a data reconciliation and validation process involving the received values, the reconciliation being conditioned by an equality between the estimates of the flow rate of the fluid to provide by each of the devices, the data reconciliation and validation process minimizing a cost function penalizing, for each reconciled datum, the difference between its value before reconciliation and its reconciled value;
- generating and sending to the memory an information based on the data reconciliation and validation process, an action relative to the production being performable based on the generated information.

17. The system of claim 16, wherein the information includes identification of a faulty sensor.

18. The system of claim 16, wherein the information comprises the reconciled value of the fluid flow rate in the line.

19. The system of claim 17, wherein the action comprises computing replacement values corresponding to the faulty sensor.

20. The system of claim 18, wherein the action is reallocation of production by lines.

* * * * *